Sept. 13, 1960 G. E. SERNIUK 2,952,657
CHEMICAL MODIFICATION OF RUBBERY COPOLYMERS
Filed Aug. 2, 1956
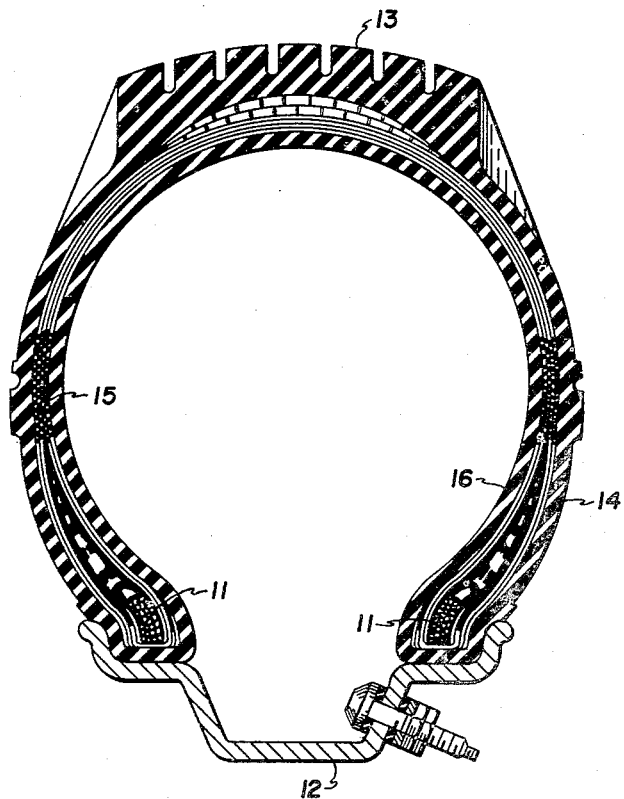
George E. Serniuk  Inventor
By W. H. Myers  Attorney

United States Patent Office 2,952,657
Patented Sept. 13, 1960

2,952,657

CHEMICAL MODIFICATION OF RUBBERY COPOLYMERS

George E. Serniuk, Roselle, N.J., assignor to Esso Research and Engineering Company, a corporation of Delaware Filed Aug. 2, 1956, Ser. No. 601,761

10 Claims. (Cl. 260—41.5)

This invention relates to novel rubber reaction products and to methods of preparing and using the same. More particularly, the present invention relates to the reaction of isoolefin-multiolefin-containing copolymers, particularly butyl rubber, with minor proportions of certain aldehydes.

Butyl rubber, which comprises the low unsaturation copolymerization product of a major proportion of an isoolefin and a minor proportion of a multiolefin, has been available commercially for a number of years and has found utility in the manufacture of certain products such as automobile inner tubes, electrical insulation, tire curing bags or bladders and the like. In some respects, butyl rubber is superior to natural rubber or any of the high unsaturation synthetic rubbers such as diene-styrene rubber, diene-nitrile rubber, polychloroprene rubber, etc. which have an unsaturation in the order of about 300 to 400 iodine number (Wijs). This is because the low unsaturation of butyl rubber renders the product, both before and after vulcanization, more resistant to oxidation and attack by chemicals than the above-mentioned highly unsaturated rubbery materials.

However, butyl rubber, due to its low unsaturation, has heretofore shown a low degree of compatibility, reinforcement, or inter-action with commonly used fillers such as carbon black, silica, clays, etc., as do the high unsaturation rubbers. This failure to be completely compatible with fillers, as exemplified by a relatively low resistivity, has somewhat restricted the amount of fillers commonly incorporated into butyl rubber blends to be vulcanized. Also, although the ozone resistance of butyl rubber is much greater than that of the highly unsaturated rubbers, since only smaller amounts of fillers could be employed in conjunction with butyl rubber, electrical insulation made from butyl rubber has been somewhat more expensive than insulation made from more highly unsaturated rubbers extended with large amounts of fillers. It is therefore very desirable to have available a butyl rubber possessing a high resistivity value which may also tolerate the addition of relatively large amounts of fillers thereto. Also, in the production of tires, it is desirable for certain layers therein to have a high modulus and/or a high elongation. For instance, in the tread area of tires, it is desirable for the rubbery copolymer to have a high elongation, whereas in the bead area of the tires, it is desirable for the rubbery copolymer employed therein to have a high modulus.

The present invention overcomes the abovementioned disadvantages and makes available a rubbery material of high resistivity which, upon vulcanization, exhibits either a high elongation, high modulus, or both. This will be apparent from the following description wherein reference will be made to the drawing in which the single figure is a vertical section of a pneumatic tubeless tire employing therein butyl rubber modified by an aldehyde in accordance with the invention.

According to the present invention, it has now been discovered that rubbery isoolefin-multiolefin-containing copolymers, particularly butyl rubber, may be improved as to resistivity, elongation and modulus by reacting the rubbery copolymer in the presence of a Friedel-Crafts catalyst with a minor proportion of a $C_1$ to $C_{10}$ aliphatic or aromatic aldehyde or substances such as polymeric aldehydes or oxygen-containing heterocyclic compounds which, under reaction conditions, form in situ $C_1$ to $C_{10}$ aliphatic or aromatic aldehydes.

Typical aliphatic and aromatic aldehydes or substances which, under reaction conditions form such aldehydes, include, among others, the following: paraformaldehyde, formaldehyde, acetaldehyde, valeraldehyde, benzaldehyde, tolualdehyde, cinnamaldehyde, anisaldehyde, acrolein, crotonaldehyde, trioxane, furfural, phenylacetaldehyde, salicylaldehyde, nitrobenzaldehyde, naphthaldehyde, etc.

In practicing the present invention, an isoolefin-multiolefin-containing copolymer such as butyl rubber or the like is reacted with at least one of the foregoing general types of aldehydes at a temperature between about —40° and +150° C., preferably between about 0° and 100° C. for a time between about 2 minutes and 10 hours, preferably between about 5 and 240 minutes, so as to contain therein about 0.05 to 2.0, preferably 0.1 to 1.0, moles of combined aldehyde per mole of double bonds in the rubbery copolymer. In other words, the rubbery copolymer advantageously contains between about "0.1X" to "2.0X" (preferably between about "0.2X" to "1.0X") weight percent of the aldehyde, wherein:

$$X = \frac{A(L)}{(100-L)M_1 + L(M_2+A)} \times 100$$

and:

$L$ = mole percent of the multiolefin in the copolymer,
$M_1$ = molecular weight of the isoolefin,
$M_2$ = molecular weight of the multiolefin, and
$A$ = molecular weight of the aldehyde.

In one embodiment of the invention, the rubbery copolymer is preferably dissolved in a substantially inert solvent such as hexane, benzene, chloroform, cyclopentane or chlorobenzene, etc. To the resulting solution is then added the aldehyde and a hydrogen halide (e.g. hydrogen fluoride) and/or a Friedel-Crafts catalyst such as aluminum chloride, aluminum ethoxy chloride, aluminum bromide, titanium tetrachloride, uranium chloride, boron trifluoride, boron trifluoride etherate, tin tetrachloride, etc. There may likewise be added to the solution reaction products of an aldehyde with a Friedel-Crafts catalyst such as an aluminum halide, paraformaldehyde with boron trifluoride, etherate, formaldehyde with stannic chloride, paraformaldehyde with aluminum ethoxy chloride, paraformaldehyde with tin tetrachloride, trioxane with boron trifluoride etherate, etc. Reaction is then allowed to ensue at temperatures between about 0° to 150° C., preferably about 20° to 75° C. for between about 10 minutes and 5 hours. The reaction mixture is then advantageously refluxed at temperatures between about 30° and 200° C., preferably between about 50° and 150° C. for between about 20 minutes and 5 hours, although refluxing is optional. The product formed may be recovered from the reaction mixture by flashing off the inert solvent and slurrying the aldehyde-modified rubbery copolymer formed in hot water, or alternatively, by a multiple solution-precipitation technique, using such materials as hexane, chloroform, benzene, cyclopentane, or cyclohexane as solvents; acetone, methanol, isopropanol, or dioxane being suitable antisolvents. Residual solvents are then advantageously removed by heating (preferably under about 0.1 to 10.0 p.s.i.a.) for about 0.2 to 50 hours at about 25° to 100° C., preferably about 50° to 60° C.

In compounding the aldehyde-modified rubbery copolymer for vulcanization, it is advantageous to premix the modified polymer, mold release agent (such as stearic acid), antioxidant and filler; which mixture is desirably hot milled prior to vulcanization for about 1 to 60 minutes at about 200° to 450° F., prior to adding the curatives. Alternatively, the curvatives, as well as the mold release agent and filler, may be blended with the aldehyde-modified rubbery copolymer on a cold or warm mill (e.g., room temperature to about 150° F.) and the resulting compounded rubbery copolymer stock formed subsequently vulcanized. The compounded stock for vulcanization advantageously contains, per 100 parts by weight of aldehyde-modified copolymer, about 2 to 30, preferably 3 to 20 parts by weight of a bivalent metal oxide (preferably zinc oxide), about 0.5 to 5 parts by weight sulfur and about 0.3 to 3.0 parts by weight of an ultra-accelerator such as a tetra alkyl thiuram sulfide or, especially, a tellurium dialkyl dithiocarbamate. Alternative or supplemental vulcanizing agents may also be employed such as minor proportions (e.g. about 0.1 to 5 weight percent based on rubber) of organic diisocyanates or diisothiocyanates, including among others, aliphatic or aromatic diisothiocyanates or diisocyanates; e.g. hexamethylene diisocyanate; 3,3'-bitolylene 4,4'diisocyanate; hexamethylene diisothiocyanate; 3,3'-bitolylene 4,4'-diisothiocyanate; m- or p-phenylene diisocyanates or diisothiocyanates; diphenyl methane diisocyanate or diisothiocyanate, etc. Other vulcanizing agents include about 0.1 to 5.0 weight percent based on rubber of polyfunctional amines, imines or amides such as p-phenylene diamine, benzidine, hexamethylene diamine, iminodipropionitrile, 2-imino-3-benzothiazolineacetic acid, 1,4-butanedicarbonamide, etc. Alternatively, non-sulfur quinoid curing agents such as about 0.5 to 10.0 weight percent of a quinone dioxime and/or its derivatives and homologues may be employed. The filler, likewise, need not be a carbon black but may be a silica, hydrated silica, titanium dioxide, clay, etc. or an admixture of a carbon black with such fillers as hereinbefore mentioned. The compounded aldehyde-modified isolefin-multiolefin rubbery compositions of the present invention may, prior to vulcanization, also be blended with minor proportions of phenolic-aldehyde resins, urea aldehyde resins, phenol-dialcohol resins, polyvinyl alkanal resins, hydrocarbon plasticizer oils, tars, pitches, waxes, organic esters, etc.

Vulcanization of the foregoing compositions, according to the present invention, is advantageously for about 5 minutes to about 5 hours (e.g., 10 minutes to 3 hours) at about 250° to 350° F. or for about 1 to 10 minutes at about 350° to 450° F. The higher the vulcanization temperature, the shorter may be the vulcanizing time and vice versa. The optimum vulcanization conditions appear to be for about 10 to 100 minutes at about 270° to 370° F., preferably at about 285° to 350° F. Insofar as the degree of fineness of the sulfur is concerned, the sulfur may pass through a 50 mesh to about a 500 mesh screen. However, a fineness of about 200 to 350 mesh, or finer, appears to be preferable for the purposes of the present invention.

Butyl rubber or GR–I rubber (Government rubber-isobutylene) as referred to herein and in the prior art, comprises the copolymerization product of a major proportion of a $C_4$ to $C_8$ isoolefin and a minor proportion of a $C_4$ to $C_{14}$ multiolefin. Copolymers of the above general type, especially where the copolymer contains about 85 to 99.5% isobutylene or 2-methyl-1-butene and about 0.5 to 15% of a $C_4$ to $C_6$ conjugated diolefin such as isoprene, butadiene, piperylene, dimethylbutadiene or such multi-olefins as dimethallyl, cyclopentadiene, dicyclopentadiene, cyclohexadiene, allo-ocymene, vinyl fulvenes, etc. are commonly referred to in patents and literature as "butyl rubber" e.g., textbook "Synthetic Rubber," by G. S. Whitby. The preparation of butyl type rubber is described, for example, in U.S. Patent 2,356,128 to Thomas et al.

In preparing butyl rubber, a low molecular weight isoolefin, such as 2-methyl-1-butene or 3-methyl-1-butene, or preferably isobutylene may be copolymerized with a multiolefin such as a conjugated diolefin, preferably isoprene, at relatively low temperatures; generally from about 0° C. to about −200° C. or lower, an advantageous range being from about −40° C. to about −180° C., preferably from about −80° C. to −160° C. The copolymerization is conducted in the presence of a Friedel Crafts catalyst such as aluminum chloride, titanium tetrachloride, boron trifluoride, uranium chloride, aluminum ethoxy-chloride, etc., preferably dissolved in an alkyl halide such as ethyl or methyl chloride, or dissolved in carbon disulfide or an equivalent solvent. The resulting copolymer preferably has an iodine number (Wijs) between about 0–50 (preferably about 1–20) and a Staudinger molecular weight between about 20,000 and 200,000 and even more especially between about 30,000 and 150,000. When so prepared, the material is rubbery in nature and has the property of being curable with sulfur especially in the presence of bivalent metal oxides such as zinc oxide and/or in the presence of organic sulfides, particularly of the alkyl thiuram sulfide or thiocarbamate types.

Other suitable isoolefin-multiolefin copolymers other than butyl rubber which are advantageously chemically modified in accordance with the present invention by reaction with aldehydes comprise copolymers prepared from feeds composed of about 50 to 100 parts by weight of a $C_4$ to $C_{14}$ multiolefin such as a $C_4$ to $C_6$ conjugated diolefin with about 100 parts by weight of a $C_4$ to $C_8$ isoolefin such as isobutylene, 2-methyl-1-butene, or 3-methyl-1-butene. Such copolymers generally have iodine numbers between about 30 and 200 (Wijs). Still another class of isoolefin-multiolefin copolymers comprises copolymerization products formed from feeds comprising about 100 to 800 parts by weight of a $C_4$ to $C_{14}$ multiolefin with about 100 parts by weight of a $C_4$ to $C_8$ isoolefin. These copolymers generally have iodine numbers between about 50 and 300.

It is also within the purview of the present invention to chemically modify, with $C_1$ to $C_{10}$ aldehydes, tripolymers of isoolefins, multiolefins and monoolefinic compounds containing an aromatic nucleus such as styrene, alpha methyl styrene, p-methyl styrene, indene, dihydronaphthalene, p-chlorostyrene, dichlorostyrene, mixtures thereof, etc. The amount of the monoolefinic compound employed is in a minor proportion based on total reacting monomers and is generally employed in amounts such that between about 0.05 and 20, preferably 0.1 to 10 weight percent of the monoolefinic aromatic compound is combined in the resulting copolymer. Such modified tripolymers likewise may be diluted with solvents and/or extended with filters, tackifiers and viscous oils. Alternatively, the modified copolymers may be calendered without an added solvent in a hot viscous state directly on to such materials as metal, wood, fabrics, paper, cellophane or leather which are to be rubber coated. Also the compounded, modified, tripolymer may be applied to the foregoing materials in the form of a latex. It is to be understood that the modified tripolymer present in the latex or solution prior to vulcanization is advantageously compounded with conventional curatives such as sulfur and/or quinoid compounds, basic metal compounds such as bivalent metal oxides (e.g. zinc oxide), ultra accelerators such as derivatives of thiuram and/or thiocarbamic acid, etc.

The details and the advantages of the invention will be better understood from a consideration of the following experimental data.

Example I

A three-liter three-way round bottom flask fitted with a mechanical stirrer, reflux condenser, nitrogen inlet tube and water bath was charged with 100 grams of a commercial butyl rubber known as "Enjay butyl-325" corresponding to GR–I–25 rubber in hexane, i.e. having an iodine number (Wijs) of 13.3, a Mooney viscosity at 212° F. for 8 minutes of 43, and a mole percent unsaturation of 2.3. The hexane solution contained 10 grams of polymer per 100 ml. of hexane; the solution being stirred at room temperature. To this solution was added 3.14 grams of paraformaldehyde and 5.25 grams of boron trifluoride etherate. About 4 minutes after the etherate was added, the polymer gelled. At this time, the stirrer was shut off and the mixture allowed to stand for one hour, during which time the gel reverted and the mixture again became homogeneous and could be readily stirred. Stirring was continued for two hours at room temperature and two hours at reflux (i.e. 68° C.). The resulting reaction mixture, which was in the form of a solution, was then cooled to room temperature and 200 ml. of water added thereto. This mixture was stirred for 30 minutes and the polymer solution washed with water for 3 times and finally neutralized with 6 cc. of 9–N sodium hydroxide. The neutralized solution was then washed with water 4 times until the polymer solution was neutral. The aldehyde-modified butyl rubber product formed was purified by multiple precipitation employing hexane as the solvent and acetone as the anti-solvent for three times. The product was then freed of residual solvents by heating in a vacuum oven at 0.1 to 10 p.s.i.a. ( e.g. 5.0 p.s.i.a.) for 16 hours at 60° C. The resulting reaction product of the aldehyde and butyl rubber was rubbery in nature.

The foregoing product was compounded on a rubber mill at 50° C. into the following recipe:

| Component: | Parts by weight |
| --- | --- |
| Aldehyde-modified butyl rubber | 100 |
| Stearic acid | 1 |
| Carbon black | 50 |
| Zinc oxide | 5 |
| Sulfur | 2 |
| Tellurium diethyl dithiocarbamate | 1 |

The foregoing compounded stock was then cured for 60 minutes at 307° F., an unmodified control being compounded and cured in the same manner. These two stocks were then compared, their physical inspections being as follows:

| Compounded Stock | Resistivity (ohm-cm.) | Elongation (percent) |
| --- | --- | --- |
| Unmodified butyl rubber | $5.102 \times 10^7$ | 480 |
| Aldehyde-modified butyl rubber | $5.918 \times 10^{11}$ | 510 |

The above data show that the aldehyde-modified butyl rubber exhibits a much higher resistivity than does the unmodified butyl rubber. This renders the modified butyl rubber more desirable for electrical insulation, facilitates better pigment (e.g. carbon black) dispersion and permits larger amounts of carbon black to be dispersed therein. In addition, the aldehyde-modified butyl rubber vulcanizate exhibited satisfactory elongation.

Example II

The same general procedure as in Example I was repeated except that the mixture of paraformaldehyde and boron trifluoride etherate was added slowly over a period of 30 minutes. The unvulcanized polymeric modified butyl rubber did not gel under these conditions. This product was compounded, cured and evaluated as in Example I; the physical inspections being as follows compared to an unmodified butyl rubber control compounded and cured in the same general manner.

| Compounded Stock | Resistivity (ohm-cm.) | Modulus at 300% Elong. (p.s.i.) | Elongation (percent) |
| --- | --- | --- | --- |
| Unmodified butyl rubber control | $5.102 \times 10^7$ | 1450 | 480 |
| Aldehyde-modified butyl rubber | $6.246 \times 10^9$ | 1400 | 440 |

The above data show that the aldehyde-modified butyl rubber exhibits a considerably higher resistivity and comparable modulus and elongation compared to the unmodified butyl rubber control.

Example III

The same general procedure as in Example I was again repeated except that in the production of the aldehyde-modified butyl rubber, at the end of the reaction, 100 ml. of a 5% aqueous solution of sulfuric acid was added in order to hydrolyze any dioxane derivative which may have formed. This mixture was stirred and refluxed for an additional 30 minutes.

One hundred parts by weight of the foregoing aldehyde-modified butyl rubber were compounded into the same recipe as in Example I and compared to an unmodified butyl rubber control; both rubbery compositions being vulcanized for 60 minutes at 307° F. Their physical inspections were as follows:

| Compounded Stock | Resistivity (ohm-cm.) | Modulus at 300% Elong. (p.s.i.) | Tensile Strength (p.s.i.) | Elongation (percent) |
| --- | --- | --- | --- | --- |
| Unmodified butyl rubber | $5.102 \times 10^7$ | 1450 | 2700 | 480 |
| Aldehyde-modified butyl rubber | $2.551 \times 10^8$ | 1500 | 2900 | 500 |

The above data show that the aldehyde-modified butyl rubber has both a higher resistivity and higher tensile strength compared to the unmodified butyl rubber control.

Example IV

The same general procedure as in Example III was repeated except that both the aldehyde-modified butyl rubber and the unmodified butyl rubber control were separately compounded into the following general recipe:

| Component: | Parts by weight |
| --- | --- |
| Rubber | 100 |
| Stearic acid | 1 |
| Carbon black (MPC) | 50 |
| 3,3'-bitolylene-4,4'-diisocyanate | 3 |

The foregoing compounded stocks were then cured for 60 minutes at 307° F. The unmodified butyl rubber stock did not vulcanize under the above curing conditions employing the foregoing diisocyanate curing system, whereas the aldehyde-modified butyl rubber stock vulcanized into an elastic, smooth, homogeneous product having desirable physical properties.

Example V

The same general procedure as in Example II was repeated except that at the completion of the reflux the aldehyde-modified butyl rubber-containing reaction mixture was treated at 68° C. for 30 minutes with 50 ml. of methanol containing 1 ml. of concentrated sulfuric acid.

This mixture was heated at reflux and 100 ml. of distillate collected over a period of 30 minutes. The product formed was then recovered and compounded in the same manner as in Example I. This product compared with an unmodified butyl rubber control as follows:

| Compounded Stock | Resistivity (ohm-cm.) | Tensile Strength (p.s.i.) | Elongation (percent) |
|---|---|---|---|
| Unmodified butyl rubber | $5.102 \times 10^7$ | 2700 | 480 |
| Aldehyde-modified butyl rubber | $5.208 \times 10^7$ | 2750 | 620 |

The above data show that the aldehyde-modified butyl rubber exhibits a considerably higher elongation and equivalent resistivity and tensile strength compared to the unmodified butyl rubber vulcanizate.

*Example VI*

A three-liter three-way round bottom flask, fitted with a mechanical stirrer, reflux condenser, nitrogen inlet tube, and a water bath was charged with 789 grams of a hexane solution of a commercial butyl rubber known as Enjay butyl-325 corresponding to GR–I–25 rubber, i.e. having an iodine number (Wijs) of 13.3 (supra). The hexane employed had been pretreated at room temperature for 15 minutes with an excess of aluminum chloride to remove impurities. The hexane solution contained 10 grams of polymer per 100 ml. of hexane; the solution being stirred at room temperature. To this solution was added 1.84 grams of a complex formed by reacting 1.046 grams of paraformaldehyde at 60° C. with 1.75 grams of boron trifluoride etherate for 10 minutes. Stirring was continued for 4 hours at room temperature. The reaction mixture was allowed to stand overnight at room temperature (25° C.).

The modified polymer was then isolated by multiple-solution-precipitation employing hexane as the solvent and acetone as the anti-solvent for three times. The substantially pure product formed was then freed of residual solvents by heating in a vacuum oven at 0.1 to 10 p.s.i.a. (e.g. 5 p.s.i.a.) for 16 hours at 60° C.

The foregoing rubbery product was compounded into the following recipe:

| Component: | Parts by weight |
|---|---|
| Aldehyde-modified butyl rubber | 100 |
| Stearic acid | 1 |
| Carbon black (MPC) | 50 |
| Zinc oxide | 5 |
| Sulfur | 2 |
| Tellurium diethyl dithiocarbamate | 1 |

The foregoing compounded stock was then cured for 60 minutes at 307° F., an unmodified control being compounded and cured in the same general manner. These two stocks were then compared, their physical inspections being as follows:

| Compounded Stock | Resistivity (ohm-cm.) | Modulus at 300% Elong. (p.s.i.) | Tensile Strength (p.s.i.) | Elong. (percent) |
|---|---|---|---|---|
| Unmodified butyl rubber | $1.516 \times 10^8$ | 1150 | 2600 | 500 |
| Aldehyde-modified butyl rubber | $1.543 \times 10^{12}$ | 1700 | 2900 | 475 |

The above data show that the aldehyde-modified butyl rubber exhibits a much higher resistivity, modulus and tensile strength as compared to the unmodified butyl rubber vulcanizate. This renders the aldehyde-modified butyl rubber more desirable in tires or for electrical insulation and other applications where high modulus and/or good electrical properties are desirable.

*Example VII*

The same general procedure as in Example VI was repeated using trioxane instead of paraformaldehyde as the aldehydic-portion of the aldehyde-catalyst complex reacted with the butyl rubber. The resulting product, which was compounded and cured in the same general manner as in Example VI, compared to unmodified butyl rubber as follows:

| Compounded Stock | Resistivity (ohm-cm.) | Modulus at 300% Elong. (p.s.i.) | Tensile Strength (p.s.i.) | Elong. (percent) |
|---|---|---|---|---|
| Unmodified butyl rubber | $1.516 \times 10^8$ | 1150 | 2600 | 500 |
| Aldehyde-modified butyl rubber | $4.195 \times 10^{11}$ | 1650 | 2850 | 520 |

The above data show the aldehyde-modified butyl rubber vulcanizate was superior to the unmodified butyl rubber vulcanizate as to resistivity, modulus, tensile strength and elongation. Of these, the improvements in the aldehyde-modified butyl rubber vulcanizate of higher resistivity and higher modulus stand out. Such a modified vulcanizate which facilitates better carbon black dispersion and permits larger amounts of carbon black or other fillers to be dispersed therein is of utility in tires, particularly in the bead, sidewall and tread areas and in electrical insulation due to improved electrical properties indicated by the high resistivity obtained.

*Example VIII*

A three-liter three-way round bottom flask fitted with a mechanical stirrer, reflux condenser, nitrogen inlet tube, and a water bath was charged with 1589 grams of a chloroform solution of a commercial butyl rubber corresponding to GR–I–25 rubber, i.e. having an iodine number (Wijs) of 13.3 (supra). The chloroform solution contained 100 grams of polymer per 100 ml. of chloroform; the solution being stirred at room temperature. To this solution was added 29 grams of a complex formed by reacting, at 25° C. for 10 minutes, 3.0 grams of paraformaldehyde and 26 grams (i.e) 11.7 ml.) of stannic chloride mixed with an additional 50 ml. of chloroform. This mixture was stirred at room temperature for 4 hours and allowed to stand overnight at room temperature. Stirring was resumed on the following day for a period of 8 hours, the reaction mixture then being allowed to stand for 2 days. At this time, the stannic chloride catalyst was quenched with an excess of water. The polymer-containing-solution was then washed with water 4 times, followed by 100 ml. of a 2 weight percent aqueous solution of sodium carbonate. The resulting mixture was neutralized by a 16 weight percent aqueous solution of hydrogen chloride and finally washed 3 times with excess water. The resulting aldehyde-modified butyl rubber formed was purified by multiple solution-precipitation employing chloroform as the solvent and acetone as the anti-solvent for three times. The product was then freed of residual solvents by heating in a vacuum oven at 0.1 to 10 p.s.i.a. (e.g. 5 p.s.i.a.) for 16 hours at 60° C. The resulting reaction product of the aldehyde and butyl rubber was rubbery in nature and had an improved resistivity.

*Example IX*

The same general procedure was repeated as in Example VIII, except that to the butyl rubber solution was added 5.5 grams of paraformaldehyde-boron trifluoride complex which had been prepared by reacting 3.14 grams of paraformaldehyde with 5.25 grams of boron trifluoride etherate at a temperature of 50° C. for 10 minutes. The paraformaldehyde-boron trifluoride complex was first admixed with 50 ml. of chloroform and then with the chloroform solution of butyl rubber; the resulting mixture being stirred at room temperature for six hours in a nitrogen atmosphere. This reaction mixture was then allowed to stand at room temperature overnight. The aldehyde-modified butyl rubber product formed was purified by multiple solution-precipitation employing chloroform as the solvent and acetone as the anti-solvent for three times.

The product was then washed with an excess (i.e. 100 cc.) of a 5 weight percent aqueous solution of sodium hydroxide and subsequently washed 4 times with 1000 cc. of water until the wash water was neutral. The aldehyde-modified butyl rubber was then purified by precipitation from chloroform by acetone. The precipitated product was then freed of residual solvents by heating in a vacuum oven at 0.1 to 10 p.s.i.a. (e.g. 5 p.s.i.a.), for 16 hours at 60° C. The resulting reaction product of the aldehyde and butyl rubber was rubbery in nature and upon curing with sulfur, zinc oxide and tetramethyl thiuram disulfide exhibited desirable resistivity, modulus and tensile strength.

A 2-gram portion of the product prepared as above was then dissolved in 25 ml. of benzene and 4 drops of hexamethylene diisocyanate were added thereto. After standing at room temperature for 3 days, the polymer gelled, whereas an unmodified butyl rubber polymer treated otherwise under same conditions did not gel when 4 drops of hexamethylene diisocyanate were added thereto.

One particularly advantageous use for the aldehyde-modified butyl rubber compositions of the present invention is pneumatic tires of either the inner tube containing variety or in tubeless type tires. Referring now to the drawing, there is shown a pneumatic tubeless tire which comprises a hollow toroidal type member which is substantially U-shaped in cross-section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions constitute the bead portions 11—11 of the tire inside of which are a plurality of bead wires adhesively embedded and molded in a rubber. The outer surfaces of the bead portion and/or rim 12 are advantageously formed into any conventional air-sealing means to aid in adhesion of the outer bead portion to rim 12 when the tire is inflated. The outer surface of the tire also includes tread area 13 and sidewalls 14. The open portion of the horseshoe-shaped tire faces that portion of the inner circumference of the tire which is adjacent the said tread area 13 of the tire.

The remaining construction of the tire may vary according to conventional fabrication, but in general the tire is a multi-layered type of structure with an outer layer as abovementioned. The layer next adjacent the outer layer generally comprises a carcass 15 which includes a rubber having incorporated therein a fabric composed of a plurality of cotton, rayon, nylon or steel cords, etc. The tire also includes an inner lining 16 advantageously made from rubber, e.g. an aldehyde-modified isoolefin-multiolefin rubber in accordance with the invention which has been at least partially vulcanized for about 1 to 60 minutes at about 200° to 400° F. optionally in the presence of an organic diisocyanate or diisothiocyanate, in accordance with the invention. This inner lining must be substantially impermeable to air. The above multi-layers, at least three in number, are conventionally bonded or otherwise adhered together, for example, by cementing and/or especially by vulcanizing according to the invention to form a tire of a unitary structure.

The compositions, comprising butyl rubber or other isoolefin-multiolefin-containing copolymer, reacted with an aldehyde, of the present invention, may be employed generally throughout the tire. For example, as above mentioned, the inner lining 16 may comprise an aldehyde-modified butyl rubber which has been vulcanized with sulfur. Alternatively, the inner lining 16 may comprise ordinary butyl rubber which has been bonded to carcass 15 by an interposed tie ply of an aldehyde-modified isoolefin-multiolefin copolymer, particularly butyl rubber which has been vulcanized. Such an interposed tie ply facilitates the inclusion of highly unsaturated rubbers such as natural rubber, GR–S rubber, Buna-N rubber, mixtures thereof, etc., in the carcass.

The other layers of the tire, such as the intermediate carcass layer and/or the outer layer (including the tread area, the sidewall and the outer bead portions, etc.), may also comprise butyl rubber reacted with an aldehyde in accordance with the invention which has been vulcanized. Vulcanization of the carcass, plies (if any), sidewalls, and tread area is advantageously accomplished by heating the same for about 3 to 60 minutes or more at about 250° to 400° F. The butyl rubber-aldehyde containing compositions of the present invention included in the tire also preferably contain certain bivalent metal oxides (especially zinc oxide), sulfur, a vulcanization ultra-accelerator and a filler, with or without an extender or plasticizer oil, organic diisocyanates or diisothiocyanates, resin-tackifiers, etc.

The tubeless tire may also contain, in at least the tread area 13, an oil-extended high molecular weight (e.g. viscosity average molecular weight of about 900,000 to about 2,000,000) butyl rubber or aldehyde-modified butyl rubber which has been bonded to a more highly unsaturated rubber (or rubbers) in carcass 15 by an interposed tie ply of butyl rubber or other isoolefin-multiolefin copolymer which has been reacted with an aldehyde and then advantageously vulcanized in the presence of sulfur, an ultra-accelerator, a bivalent metal oxide, and a filler, with or without a resin-tackifier, plasticizer hydrocarbon oil, organic diisocyanates or diisothiocyanates.

The expression "layer" as employed in the claims is intended to include tie gums, plies, liners and the tread base as well as such layers as the carcass, sidewalls, tread area, etc., of tires or similar laminated, pneumatic hollow bodies.

The compositions containing the reaction product of butyl rubber or other isoolefin-multiolefin-containing rubbery copolymers with aldehydes in accordance with the present invention, may be employed for a wide variety of applications other than for tubeless or inner tube containing tires, such as in electrical insulation, tire curing bags, bladders or diaphragms, inner tubes, car window channel strips, conveyor or transmission belting, proofed goods, steam hose, and other applications where butyl rubber has utility.

Resort may be had to modifications and variations without departing from the spirit of the invention or the scope of the appended claims.

What is claimed is:

1. A composition comprising the Friedel-Crafts reaction product formed by reacting in the presence of catalyzing quantities of a Friedel-Crafts catalyst an unvulcanized rubbery copolymer of 85 to 99.5 weight percent of a $C_4$ to $C_8$ isolefin and 0.5 to 15 weight percent of a $C_4$ to $C_{14}$ multiolefin, said rubbery copolymer having a Wijs iodine number of about 1 to 20, with a member selected from the group consisting of $C_1$ to $C_{10}$ aliphatic aldehydes, $C_1$ to $C_{10}$ aromatic aldehydes, compounds which at temperatures of 0 to 200° C. form in situ $C_1$ to $C_{10}$ aldehydes, and mixtures thereof, said reaction product containing about 0.05 to 1 mole of combined aldehyde per mole of double bonds in the copolymer.

2. Composition according to claim 1 which has been cured by a composition comprising vulcanizing quantities of sulfur.

3. Composition according to claim 1 which has been cured by a composition comprising vulcanizing quantities of a cross linking agent selected from the group consisting of organic diisocyanates, organic diisothiocyanates and mixtures thereof.

4. A process for the preparation of an aldehyde-modified rubbery copolymer which comprises dissolving a rubbery copolymer of 85 to 99.5 weight percent isobutylene and 0.5 to 15 weight percent isoprene in a substantially inert organic solvent, said rubbery copolymer having a Wijs iodine number of 1 to 20, mixing the rubbery copolymer solution with catalyzing quantities of a Friedel-Crafts catalyst and about 0.05 to 1 mole of a $C_1$ to $C_{10}$ aldehydic compound per mole of double bonds in the copolymer, regulating the temperature to between 0° and 150° C. for about 2 to 240 minutes, and recovering the resulting aldehyde-modified rubbery copolymer from the reaction mixture.

5. An aldehyde-modified isoolefin-multiolefin butyl rubber tie ply composition comprising about 100 parts by weight of the product of a Friedel-Crafts catalyzed reaction of rubber composed of 85 to 99.5 weight percent isobutylene and 0.5 to 15 weight percent isoprene and about 0.05 to 1 mole of aldehyde selected from the group consisting of $C_1$ to $C_{10}$ aliphatic aldehydes, $C_1$ to $C_{10}$ aromatic aldehydes, compounds which at temperatures between about 0 and 200° C. form in situ $C_1$ to $C_{10}$ aldehydes and mixtures thereof, per mole of double bonds in the rubber, said rubber having a Wijs iodine number of about 1 to 20; about 2 to 30 parts by weight of a basic metal oxide; about 5 to 100 parts by weight of a filler selected from the group consisting of a carbon black, a silica, and mixtures thereof; about 0.3 to 2 parts by weight of an accelerator; about 0.1 to 5 parts by weight of an organic diisocyanate; and a vulcanizing amount of sulfur.

6. A composition comprising the Friedel-Crafts reaction product formed by reacting a rubbery copolymer having a Wijs iodine number of about 1 to 20, said rubbery copolymer being a copolymer of 85 to 99.5 weight percent isobutylene and 0.5 to 15 weight percent isoprene with about 0.1X to 1.0X weight percent of an aldehydic compound selected from the group consisting of $C_1$ to $C_{10}$ aliphatic aldehydes, $C_1$ to $C_{10}$ aromatic aldehydes, compounds which at temperatures between about 0 and 200° C. form in situ $C_1$ to $C_{10}$ aldehydes and mixtures thereof, at from about 0 to 150° C. in the presence of boron trifluoride etherate, wherein:

$$X = \frac{A(L)}{(100-L)M_1 + L(M_2+A)} \times 100$$

and:

$L$ = mol percent of the multiolefin in the copolymer,
$M_1$ = molecular weight of the isoolefin,
$M_2$ = molecular weight of the multiolefin, and
$A$ = molecular weight of the aldehydic compound.

7. A composition according to claim 6 in which the aldehydic compound is reacted with the boron trifluoride etherate to form a complex prior to reacting it with the rubbery copolymer.

8. Composition according to claim 6 in which the aldehydic compound is paraformaldehyde.

9. Composition according to claim 6 in which the aldehydic compound is trioxane.

10. A process for the preparation of an aldehyde-modified rubbery copolymer which comprises dissolving a rubbery copolymer having a Wijs iodine number of about 1 to 20, said rubbery copolymer being a copolymer of 85 to 99.5 weight percent isobutylene and 0.5 to 15 weight percent isoprene in an inert organic solvent, mixing the rubbery copolymer solution formed with catalyzing quantities of boron trifluoride etherate and about 0.05 to 1 mole of an aldehyde selected from the group consisting of $C_1$ to $C_{10}$ aliphatic aldehydes, $C_1$ to $C_{10}$ aromatic aldehydes, compounds which at temperatures between about 0 and 200° C. form in situ $C_1$ to $C_{10}$ aldehydes, and mixtures thereof, per mole of double bonds in said rubbery copolymer, adjusting the temperature to between about 20 and 100° C., maintaining that temperature for from about 2 to 240 minutes and recovering an aldehyde-modified rubbery copolymer from the reaction mixture.

References Cited in the file of this patent
UNITED STATES PATENTS

| | | |
|---|---|---|
| 2,227,311 | Kipper | Dec. 31, 1940 |
| 2,265,722 | De Nie | Dec. 9, 1941 |
| 2,417,424 | Latham | Mar. 18, 1947 |
| 2,625,523 | Garber et al. | Jan. 13, 1953 |
| 2,651,624 | Swart | Sept. 8, 1953 |